(12) United States Patent
Keefe et al.

(10) Patent No.: US 7,309,194 B2
(45) Date of Patent: Dec. 18, 2007

(54) VARIABLE RADIUS BALANCED BORING HEAD

(75) Inventors: William Keefe, Orono, MN (US); Randy Cloud, Sandia Park, NM (US); Robert Wahlstrom, Mission Viejo, CA (US)

(73) Assignee: Criterion Machine Works, Costa Mesa, CA (US)

( * ) Notice: Subject to any disclaimer, the term of this patent is extended or adjusted under 35 U.S.C. 154(b) by 150 days.

(21) Appl. No.: 11/098,590

(22) Filed: Apr. 4, 2005

(65) Prior Publication Data

US 2006/0222468 A1    Oct. 5, 2006

(51) Int. Cl.
*B23B 29/034* (2006.01)

(52) U.S. Cl. ................. 408/1 R; 408/143; 408/181

(58) Field of Classification Search ........... 408/143, 408/181, 185, 184, 1 R; 409/141; 464/180; 74/572.2, 572.4; *B23B 29/02, 29/03, 29/034*
See application file for complete search history.

(56) References Cited

U.S. PATENT DOCUMENTS

| | | | |
|---|---|---|---|
| 1,645,343 A | | 10/1927 | Moorhouse |
| 2,209,867 A | * | 7/1940 | Wohlhaupter ............ 279/6 |
| 2,241,637 A | | 5/1941 | Ernst et al. |
| 2,426,400 A | | 8/1947 | Lampton et al. |
| 2,438,607 A | * | 3/1948 | Jackson .................. 279/6 |
| 2,489,719 A | * | 11/1949 | Myers .................... 82/1.2 |
| 2,906,145 A | * | 9/1959 | Morse .................. 408/182 |
| 3,000,240 A | | 9/1961 | Eckardt |
| 3,044,323 A | | 7/1962 | Sweeny |
| 3,067,636 A | * | 12/1962 | Breuning ............... 408/185 |
| 3,067,637 A | * | 12/1962 | Horning ................ 82/1.2 |
| 3,169,416 A | * | 2/1965 | Ernest et al. ........... 408/1 R |
| 3,180,187 A | * | 4/1965 | McFerren ............... 82/173 |
| 3,364,800 A | * | 1/1968 | Benjamin et al. ...... 408/239 R |
| 3,528,316 A | | 9/1970 | Hammer |
| 3,606,562 A | * | 9/1971 | Wills .................. 408/181 |
| 4,070,922 A | | 1/1978 | Wyman |
| 4,599,769 A | * | 7/1986 | Latzko et al. ........... 29/26 A |
| 4,626,144 A | | 12/1986 | Berner |
| 4,648,763 A | * | 3/1987 | Safranek ............... 409/234 |
| 5,148,845 A | * | 9/1992 | Keup et al. ............. 144/218 |
| 5,382,122 A | * | 1/1995 | Mihic .................. 409/141 |
| 6,419,427 B1 | * | 7/2002 | Galamba et al. ......... 409/131 |

FOREIGN PATENT DOCUMENTS

| | | | |
|---|---|---|---|
| EP | 673710 A1 | * | 9/1995 |
| JP | 02088108 A | * | 3/1990 |
| JP | 06335809 A | * | 12/1994 |
| JP | 09155606 A | * | 6/1997 |

\* cited by examiner

*Primary Examiner*—Daniel W. Howell
(74) *Attorney, Agent, or Firm*—Dalina Law Group, P.C.

(57) ABSTRACT

One or more embodiments of the invention enable a boring head to hold a boring tool at an adjustable offset from the axis of rotation in a balanced configuration while maintaining stability when rotating at high speed. The apparatus comprises a boring head body, a bar holder and dial screw, a boring bar, a balance shaft and a balance weight. The apparatus may be configured for a given diameter of operation through use of alternate size components and offsetting a balance weight to account for the components in use. One method of determining the various components to use comprises weighing the various components and creating a lookup table for quick lookup to enable machinists to quickly change the bore range on a machine.

16 Claims, 11 Drawing Sheets

Figure 2A      Figure 2B      Figure 2C
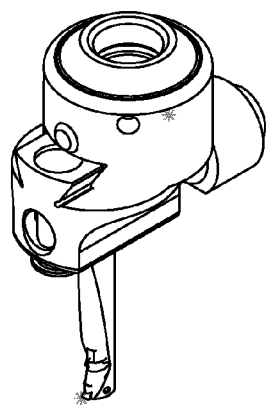
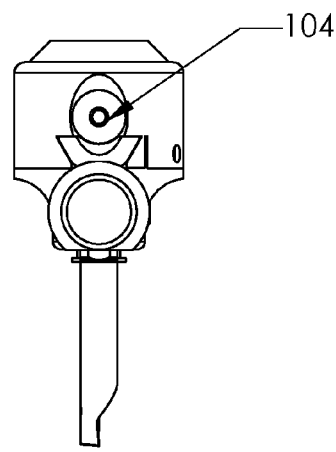
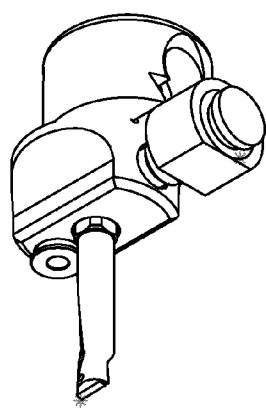
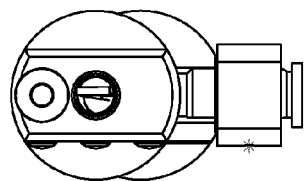
Figure 2D

Figure 4

| ITEM NO. | DESCRIPTION |
|---|---|
| 102 | DBL-202B Boring Head Body |
| 104 | DBL-202B Bar Holder & Dial Screw |
| 106 | TA-250BTX Boring Bar |
| 108 | TA-312BTX Boring Bar |
| 110 | TA-375BTX Boring Bar |
| 112 | TA-437BTX Boring Bar |
| 114 | TA-500BTX Boring Bar |
| 116 | S-1 202 Balance Shaft |
| 118 | S-2 202 Balance Shaft |
| 120 | S-3 202 Balance Shaft |
| 122 | S-4 202 Balance Shaft |
| 124 | S-5 202 Balance Shaft |
| 126 | S-6 202 Balance Shaft |
| 128 | W-1 202 Balance Weight |
| 130 | W-2 202 Balance Weight |
| 132 | W-3 202 Balance Weight |
| 134 | W-4 202 Balance Weight |

Figure 6

| BORE RANGE | | TA-250BTX CENTER HOLE | | | | BORE RANGE | | TA-250BTX OUTBOARD HOLE | | | |
|---|---|---|---|---|---|---|---|---|---|---|---|
| | | SHAFT | HOLE | WEIGHT | # of TURNS | | | SHAFT | HOLE | WEIGHT | # of TURNS |
| 0.250 | 0.299 | S-3 | OB | - | - | 1.500 | 1.549 | S-3 | XH | - | - |
| 0.300 | 0.349 | - | - | - | - | 1.550 | 1.599 | S-3 | XH | - | - |
| 0.350 | 0.399 | - | - | - | - | 1.600 | 1.649 | S-6 | XH | - | - |
| 0.400 | 0.449 | S-3 | XH | - | - | 1.650 | 1.699 | S-6 | XH | - | - |
| 0.450 | 0.499 | S-6 | XH | - | - | 1.700 | 1.749 | S-5 | XH | - | - |
| 0.500 | 0.549 | S-6 | XH | - | - | 1.750 | 1.799 | S-6 | XH | W-4 | 2 |
| 0.550 | 0.599 | S-5 | XH | - | - | 1.800 | 1.849 | S-4 | XH | - | - |
| 0.600 | 0.649 | S-5 | XH | - | - | 1.850 | 1.899 | S-2 | XH | - | - |
| 0.650 | 0.699 | S-5 | XH | W-4 | - | 1.900 | 1.949 | S-4 | XH | W-4 | - |
| 0.700 | 0.749 | S-6 | XH | W-3 | - | 1.950 | 1.999 | S-1 | XH | - | - |
| 0.750 | 0.799 | S-4 | XH | W-4 | - | 2.000 | 2.049 | S-2 | XH | W-3 | 1 |
| 0.800 | 0.849 | S-5 | XH | W-3 | 2 | 2.050 | 2.099 | S-2 | XH | W-4 | 12 |
| 0.850 | 0.899 | S-4 | XH | W-3 | - | 2.100 | 2.149 | S-1 | XH | W-4 | 1 |
| 0.900 | 0.949 | S-4 | XH | W-4 | 12 | 2.150 | 2.199 | S-1 | XH | W-3 | 7 |
| 0.950 | 0.999 | S-1 | XH | W-3 | 1 | 2.200 | 2.249 | S-1 | XH | W-3 | 12 |
| 1.000 | 1.049 | S-1 | XH | W-3 | 7 | 2.250 | 2.299 | S-1 | XH | W-3 | 12 |
| 1.050 | 1.099 | S-1 | XH | W-3 | 12 | 2.300 | 2.349 | S-1 | XH | W-3/W-4 | (W-3) 11/(W-4) 1 |
| 1.100 | 1.149 | S-1 | XH | W-3/W-4 | (W-3) 12/(W-4) 0 | 2.350 | 2.399 | S-1 | XH | W-3/W-4 | (W-3) 16/(W-4) 3 |
| 1.150 | 1.199 | S-1 | XH | W-3/W-4 | (W-3) 16/(W-4) 0 | 2.400 | 2.449 | S-1 | XH | W-2 | 4 |
| 1.200 | 1.249 | S-1 | XH | W-2 | 5 | 2.450 | 2.499 | S-1 | XH | W-2 | 7 |
| 1.250 | 1.299 | S-1 | XH | W-2 | 8 | 2.500 | 2.549 | S-1 | XH | W-2 | 10 |
| 1.300 | 1.349 | S-1 | XH | W-2 | 10 | 2.550 | 2.599 | S-1 | XH | W-2/W-4 | (W-2) 10/(W-4) 0 |
| 1.350 | 1.399 | S-1 | XH | W-2/W-4 | (W-2) 10/(W-4) 0 | 2.600 | 2.649 | S-1 | XH | W-1 | - |
| 1.400 | 1.449 | S-1 | XH | W-1 | 1 | 2.650 | 2.699 | S-1 | XH | W-1 | 2 |
| 1.450 | 1.499 | S-1 | XH | W-1 | 3 | 2.700 | 2.749 | S-1 | XH | W-1 | 4 |
| 1.500 | | S-1 | XH | W-1 | 3 | 2.750 | | S-1 | XH | W-1 | 6 |

TA-250BTX Range .250 Ø - 2.750 Ø

Figure 7

| BORE RANGE | | TA-312BTX CENTER HOLE | | | | BORE RANGE | | TA-312BTX OUTBOARD HOLE | | | |
|---|---|---|---|---|---|---|---|---|---|---|---|
| | | SHAFT | HOLE | WEIGHT | # of TURNS | | | SHAFT | HOLE | WEIGHT | # of TURNS |
| 0.312 | 0.361 | S-3 | OB | - | - | 1.563 | 1.612 | S-3 | XH | - | - |
| 0.362 | 0.411 | - | - | - | - | 1.613 | 1.662 | S-3 | XH | - | - |
| 0.412 | 0.461 | - | - | - | - | 1.663 | 1.712 | S-6 | XH | - | - |
| 0.462 | 0.511 | S-3 | XH | - | - | 1.713 | 1.762 | S-5 | XH | - | - |
| 0.512 | 0.561 | S-6 | XH | - | - | 1.763 | 1.812 | S-5 | XH | - | - |
| 0.562 | 0.611 | S-6 | XH | - | - | 1.813 | 1.862 | S-5 | XH | W-4 | - |
| 0.612 | 0.661 | S-5 | XH | - | - | 1.863 | 1.912 | S-5 | XH | W-4 | 2 |
| 0.662 | 0.711 | S-5 | XH | - | - | 1.913 | 1.962 | S-4 | XH | W-4 | - |
| 0.712 | 0.761 | S-5 | XH | W-4 | - | 1.963 | 2.012 | S-4 | XH | W-4 | 5 |
| 0.762 | 0.811 | S-6 | XH | W-3 | - | 2.013 | 2.062 | S-1 | XH | - | - |
| 0.812 | 0.861 | S-4 | XH | W-4 | - | 2.063 | 2.112 | S-1 | XH | W-3 | 2 |
| 0.862 | 0.911 | S-5 | XH | W-3 | 2 | 2.113 | 2.162 | S-1 | XH | W-4 | 5 |
| 0.912 | 0.961 | S-4 | XH | W-4 | - | 2.163 | 2.212 | S-1 | XH | W-3 | 10 |
| 0.962 | 1.011 | S-1 | XH | W-3 | - | 2.213 | 2.262 | S-2 | XH | W-3 | 3 |
| 1.012 | 1.061 | S-2 | XH | W-3 | 9 | 2.263 | 2.312 | S-1 | XH | W-3 | 8 |
| 1.062 | 1.111 | S-1 | XH | W-3 | 2 | 2.313 | 2.362 | S-1 | XH | W-3 | 14 |
| 1.112 | 1.161 | S-1 | XH | W-3 | 7 | 2.363 | 2.412 | S-1 | XH | W-3/W-4 | (W-3) 12/(W-4) 0 |
| 1.162 | 1.211 | S-1 | XH | W-3/W-4 | (W-3) 11/(W-4) 0 | 2.413 | 2.462 | S-1 | XH | W-3/W-4 | (W-3) 16/(W-4) 4 |
| 1.212 | 1.261 | S-1 | XH | W-3/W-4 | (W-3) 16/(W-4) 5 | 2.463 | 2.512 | S-1 | XH | W-2 | 5 |
| 1.262 | 1.311 | S-1 | XH | W-2 | 5 | 2.513 | 2.562 | S-1 | XH | W-2 | 8 |
| 1.312 | 1.361 | S-1 | XH | W-2 | 8 | 2.563 | 2.612 | S-1 | XH | W-2/W-4 | (W-2) 9/(W-4) 0 |
| 1.362 | 1.411 | S-1 | XH | W-2/W-4 | (W-2) 9/(W-4) 0 | 2.613 | 2.662 | S-1 | XH | W-2/W-3 | (W-2) 9/(W-3) 0 |
| 1.412 | 1.461 | S-1 | XH | W-2/W-3 | (W-2) 9/(W-3) 0 | 2.663 | 2.712 | S-1 | XH | W-1 | 1 |
| 1.462 | 1.511 | S-1 | XH | W-1 | 1 | 2.713 | 2.762 | S-1 | XH | W-1 | 2 |
| 1.512 | 1.561 | S-1 | XH | W-1 | 3 | 2.763 | 2.812 | S-1 | XH | W-1 | 4 |
| 1.562 | | S-1 | XH | W-1 | 3 | 2.813 | | | | W-1 | 6 |

TA-312BTX Range .312 Ø - 2.813 Ø

Figure 8

| | TA-375BTX CENTER HOLE | | | | | TA-375BTX OUTBOARD HOLE | | | |
|---|---|---|---|---|---|---|---|---|---|
| BORE RANGE | | SHAFT | HOLE | WEIGHT | # of TURNS | BORE RANGE | | SHAFT | HOLE | WEIGHT | # of TURNS |
| 0.375 | 0.424 | S-3 | OB | - | - | 1.625 | 1.674 | S-3 | XH | - | - |
| 0.425 | 0.474 | - | - | - | - | 1.675 | 1.724 | S-6 | XH | - | - |
| 0.475 | 0.524 | - | - | - | - | 1.725 | 1.774 | S-6 | XH | - | - |
| 0.525 | 0.574 | S-3 | XH | - | - | 1.775 | 1.824 | S-5 | XH | - | - |
| 0.575 | 0.624 | S-6 | XH | - | - | 1.825 | 1.874 | S-6 | XH | W-4 | 2 |
| 0.625 | 0.674 | S-6 | XH | - | - | 1.875 | 1.924 | S-5 | XH | W-4 | - |
| 0.675 | 0.724 | S-5 | XH | - | - | 1.925 | 1.974 | S-2 | XH | - | - |
| 0.725 | 0.774 | S-6 | XH | W-4 | 2 | 1.975 | 2.024 | S-4 | XH | W-4 | 7 |
| 0.775 | 0.824 | S-5 | XH | W-4 | - | 2.025 | 2.074 | S-2 | XH | W-4 | - |
| 0.825 | 0.874 | S-6 | XH | W-3 | - | 2.075 | 2.124 | S-2 | XH | W-3 | - |
| 0.875 | 0.924 | S-4 | XH | W-4 | - | 2.125 | 2.174 | S-1 | XH | W-4 | - |
| 0.925 | 0.974 | S-1 | XH | - | - | 2.175 | 2.224 | S-1 | XH | W-3 | 8 |
| 0.975 | 1.024 | S-4 | XH | W-3 | 1 | 2.225 | 2.274 | S-1 | XH | W-3 | 1 |
| 1.025 | 1.074 | S-4 | XH | W-4 | 4 | 2.275 | 2.324 | S-1 | XH | W-3 | 6 |
| 1.075 | 1.124 | S-2 | XH | W-3 | 10 | 2.325 | 2.374 | S-1 | XH | W-3 | 12 |
| 1.125 | 1.174 | S-1 | XH | W-3 | 3 | 2.375 | 2.424 | S-1 | XH | W-3/W-4 | (W-3) 11/(W-4) 0 |
| 1.175 | 1.224 | S-1 | XH | W-3 | 9 | 2.425 | 2.474 | S-1 | XH | W-3/W-4 | (W-3) 16/(W-4) 2 |
| 1.225 | 1.274 | S-1 | XH | W-3 | 14 | 2.475 | 2.524 | S-1 | XH | W-2 | 4 |
| 1.275 | 1.324 | S-1 | XH | W-3/W-4 | (W-3) 13/(W-4) 1 | 2.525 | 2.574 | S-1 | XH | W-2 | 7 |
| 1.325 | 1.374 | S-1 | XH | W-3/W-4 | (W-3) 16/(W-4) 7 | 2.575 | 2.624 | S-1 | XH | W-2 | 10 |
| 1.375 | 1.424 | S-1 | XH | W-2 | 6 | 2.625 | 2.674 | S-1 | XH | W-2/W-4 | (W-2) 10/(W-4) 0 |
| 1.425 | 1.474 | S-1 | XH | W-2 | 9 | 2.675 | 2.724 | S-1 | XH | W-1 | - |
| 1.475 | 1.524 | S-1 | XH | W-2/W-4 | (W-2) 9/(W-4) 0 | 2.725 | 2.774 | S-1 | XH | W-1 | 2 |
| 1.525 | 1.574 | S-1 | XH | W-1 | - | 2.775 | 2.824 | S-1 | XH | W-1 | 4 |
| 1.575 | 1.624 | S-1 | XH | W-1 | 2 | 2.825 | 2.874 | S-1 | XH | W-1 | 6 |
| 1.625 | | S-1 | XH | W-1 | 4 | 2.875 | | | | W-1 | 8 |

TA-375BTX Range .375 Ø - 2.875 Ø

Figure 9

| TA-437BTX CENTER HOLE | | | | | TA-437BTX OUTBOARD HOLE | | | | |
|---|---|---|---|---|---|---|---|---|---|
| BORE RANGE | | SHAFT | HOLE | WEIGHT | # of TURNS | BORE RANGE | | SHAFT | HOLE | WEIGHT | # of TURNS |
| 0.437 | 0.486 | S-3 | OB | -- | -- | 1.688 | 1.737 | S-3 | XH | -- | -- |
| 0.487 | 0.536 | -- | -- | -- | -- | 1.738 | 1.787 | S-6 | XH | -- | -- |
| 0.537 | 0.586 | S-3 | -- | -- | -- | 1.788 | 1.837 | S-5 | XH | -- | -- |
| 0.587 | 0.636 | S-6 | XH | -- | -- | 1.838 | 1.887 | S-6 | XH | -- | -- |
| 0.637 | 0.686 | S-6 | XH | -- | -- | 1.888 | 1.937 | S-4 | XH | -- | -- |
| 0.687 | 0.736 | S-5 | XH | -- | -- | 1.938 | 1.987 | S-2 | XH | -- | -- |
| 0.737 | 0.786 | S-6 | XH | -- | -- | 1.988 | 2.037 | S-6 | XH | W-3 | 3 |
| 0.787 | 0.836 | S-5 | XH | W-4 | -- | 2.038 | 2.087 | S-4 | XH | W-4 | 8 |
| 0.837 | 0.886 | S-5 | XH | W-4 | -- | 2.088 | 2.137 | S-1 | XH | -- | -- |
| 0.887 | 0.936 | S-6 | XH | W-3 | 2 | 2.138 | 2.187 | S-2 | XH | W-3 | 3 |
| 0.937 | 0.986 | S-4 | XH | W-4 | 4 | 2.188 | 2.237 | S-1 | XH | W-4 | 7 |
| 0.987 | 1.036 | S-2 | XH | W-4 | 10 | 2.238 | 2.287 | S-1 | XH | W-3 | 9 |
| 1.037 | 1.086 | S-4 | XH | W-3 | 2 | 2.288 | 2.337 | S-1 | XH | W-3 | 4 |
| 1.087 | 1.136 | S-1 | XH | W-3 | 6 | 2.338 | 2.387 | S-1 | XH | W-3 | 10 |
| 1.137 | 1.186 | S-1 | XH | W-3 | -- | 2.388 | 2.437 | S-1 | XH | W-3 | 16 |
| 1.187 | 1.236 | S-1 | XH | W-3/W-4 | 4 | 2.438 | 2.487 | S-1 | XH | W-3/W-4 | (W-3) 14/(W-4) 0 |
| 1.237 | 1.286 | S-1 | XH | W-2 | 7 | 2.488 | 2.537 | S-1 | XH | W-2 | 3 |
| 1.287 | 1.336 | S-1 | XH | W-2 | 10 | 2.538 | 2.587 | S-1 | XH | W-2 | 6 |
| 1.337 | 1.386 | S-1 | XH | W-3/W-4 | (W-3) 14/(W-4) 2 | 2.588 | 2.637 | S-1 | XH | W-2 | 9 |
| 1.387 | 1.436 | S-1 | XH | W-2 | 4 | 2.638 | 2.687 | S-1 | XH | W-2/W-4 | (W-2) 9/(W-4) 0 |
| 1.437 | 1.486 | S-1 | XH | W-2 | 7 | 2.688 | 2.737 | S-1 | XH | W-2/W-3 | (W-2) 9/(W-3) 0 |
| 1.487 | 1.537 | S-1 | XH | W-2/W-4 | (W-2) 10/(W-4) 0 | 2.738 | 2.787 | S-1 | XH | W-1 | 1 |
| 1.537 | 1.586 | S-1 | XH | W-1 | 1 | 2.788 | 2.837 | S-1 | XH | W-1 | 3 |
| 1.587 | 1.637 | S-1 | XH | W-1 | 2 | 2.838 | 2.887 | S-1 | XH | W-1 | 5 |
| 1.637 | 1.686 | S-1 | XH | W-1 | 4 | 2.888 | 2.937 | S-1 | XH | W-1 | 7 |
| 1.687 | | S-1 | XH | W-1 | | 2.938 | | S-1 | XH | W-1 | 9 |

TA-437BTX Range .437 0 - 2.938 0

Figure 10

| BORE RANGE | | TA-500BTX CENTER HOLE | | | | BORE RANGE | | TA-500BTX OUTBOARD HOLE | | | |
|---|---|---|---|---|---|---|---|---|---|---|---|
| | | SHAFT | HOLE | WEIGHT | # of TURNS | | | SHAFT | HOLE | WEIGHT | # of TURNS |
| 0.500 | 0.549 | S-3 | OB | - | - | 1.740 | 1.789 | S-6 | XH | - | - |
| 0.550 | 0.599 | - | - | - | - | 1.790 | 1.839 | S-6 | XH | - | - |
| 0.600 | 0.649 | - | - | - | - | 1.840 | 1.889 | S-5 | XH | - | - |
| 0.650 | 0.699 | S-3 | XH | - | - | 1.890 | 1.939 | S-6 | XH | W-4 | 2 |
| 0.700 | 0.749 | S-6 | XH | - | - | 1.940 | 1.989 | S-4 | XH | - | - |
| 0.750 | 0.799 | S-6 | XH | - | - | 1.990 | 2.039 | S-2 | XH | - | - |
| 0.800 | 0.849 | S-5 | XH | - | - | 2.040 | 2.089 | S-4 | XH | W-4 | - |
| 0.850 | 0.899 | S-6 | XH | W-4 | 2 | 2.090 | 2.139 | S-1 | XH | - | - |
| 0.900 | 0.949 | S-5 | XH | W-4 | 1 | 2.140 | 2.189 | S-4 | XH | W-3 | 3 |
| 0.950 | 0.999 | S-6 | XH | W-3 | - | 2.190 | 2.239 | S-1 | XH | W-4 | 9 |
| 1.000 | 1.049 | S-4 | XH | W-4 | 7 | 2.240 | 2.289 | S-2 | XH | W-3 | 2 |
| 1.050 | 1.099 | S-2 | XH | W-4 | 10 | 2.290 | 2.339 | S-1 | XH | W-3 | 8 |
| 1.100 | 1.149 | S-4 | XH | W-3 | 4 | 2.340 | 2.389 | S-1 | XH | W-3 | 14 |
| 1.150 | 1.199 | S-1 | XH | W-4 | 9 | 2.390 | 2.439 | S-1 | XH | W-3 | W-3/W-4 12/(W-4) 3 |
| 1.200 | 1.249 | S-1 | XH | W-3 | - | 2.440 | 2.489 | S-1 | XH | W-3/W-4 | (W-3) 12/(W-4) 3 |
| 1.250 | 1.299 | S-1 | XH | W-3 | 6 | 2.490 | 2.539 | S-1 | XH | W-2 | 2 |
| 1.300 | 1.349 | S-1 | XH | W-3 | 12 | 2.540 | 2.589 | S-2 | XH | W-2 | 5 |
| 1.350 | 1.399 | S-1 | XH | W-3/W-4 | (W-3) 11/(W-4) 0 | 2.590 | 2.639 | S-1 | XH | W-2 | 9 |
| 1.400 | 1.449 | S-1 | XH | W-3/W-4 | (W-3) 16/(W-4) 2 | 2.640 | 2.689 | S-1 | XH | W-2 | 10 |
| 1.450 | 1.499 | S-1 | XH | W-2 | (W-2) 9/(W-3) 0 | 2.690 | 2.739 | S-1 | XH | W-3/W-2 | (W-3) 15/(W-2) 0 |
| 1.500 | 1.549 | S-1 | XH | W-2 | 5 | 2.740 | 2.789 | S-1 | XH | W-1 | 1 |
| 1.550 | 1.599 | S-1 | XH | W-2 | 8 | 2.790 | 2.839 | S-1 | XH | W-1 | 3 |
| 1.600 | 1.649 | S-1 | XH | W-2/W-3 | 10 | 2.840 | 2.889 | S-1 | XH | W-1 | 4 |
| 1.650 | 1.699 | S-1 | XH | W-2 | 1 | 2.890 | 2.939 | S-1 | XH | W-1 | 6 |
| 1.700 | 1.749 | S-1 | XH | W-2 | 3 | 2.940 | 2.989 | S-1 | XH | W-1 | 8 |
| 1.750 | | S-1 | XH | W-2 | 5 | 2.990 | 3.000 | S-1 | XH | W-1 | 10 |

TA-500BTX Range .500 Ø - 3.000 Ø

VARIABLE RADIUS BALANCED BORING HEAD

BACKGROUND OF THE INVENTION

1. Field of the Invention

Embodiments of the invention described herein pertain to the field of tools. More particularly, but not by way of limitation, one or more embodiments of the invention enable a boring head to hold a boring tool at an adjustable offset from the axis of rotation in a balanced configuration while maintaining stability when rotating at high speed.

2. Description of the Related Art

There are a number of requirements for utilizing boring tools in order to bore holes in work pieces. Currently, boring tools are rotated at slow speeds with offset from the axis of rotation of the boring head. Use of a boring tool with a small shaft diameter allows for smaller diameter cuts in work pieces but with a boring tool offset from the axis of rotation, there is a limit to the speed at which the boring head and boring tool can rotate and therefore there is a limit to the speed at which a hole may be bored in a work piece. In machine shops where contracts pay for a number of parts manufactured, it is in the interest of the machine shop to produce as many parts per hour as is possible in order to increase profits per time period, however this is not possible with tools that operate slowly. In addition, the requirement that many different diameter holes are generally required to be cut on many different parts currently requires multiple tools of different diameters. Although the tools perform the same function except for their differing diameters, the shop must still purchase and maintain a range of tools with varying diameter offsets. For at least the limitations described above there is a need for system that enables high speed boring heads to have a variable diameter while maintaining balance at high speeds for more efficient operation.

SUMMARY OF THE INVENTION

One or more embodiments of the invention enable a boring head to hold a boring bar comprising a cutting element at an adjustable offset from the axis of rotation in a balanced configuration thereby maintaining stability when rotating at high speed. The apparatus may comprise a boring head body, a bar holder and dial screw, a boring bar, a balance shaft and a balance weight. The apparatus may not always use a balance weight or balance shaft. The apparatus may be configured for a given diameter of operation through the use of alternate size components and offsetting a balance weight to account for the components in use.

One method of determining the various components to use for a given bore range comprises weighing the various components and/or calculating their weight and center of gravity offsets from the axis of rotation to enable a machinist to change the bore range on a machine while keeping an embodiment of the present apparatus in balance for high speed use. A quicker method of operation allows for pre-calculation of the various settings required and storing the settings in a way that allows a machinist to quickly adjust the apparatus without undue calculations. When the various component settings for a desired bore range have been pre-calculated, they may be stored and used from a lookup table. While the quick lookup table is correct and end user may be able to deviate slightly from the lookup table and still achieve good results in certain scenarios. For example, after a desired bore range is found in the lookup table the correct shaft for that bore range is selected by reading to the right in the lookup in the shaft column. The lookup also shows the correct tool hole in which to place the balance shaft. The weight column is the used to obtain the proper weight to use in balancing the apparatus. The tool is then inserted and the set screw is rotated in order to engage the dimple on the shaft of the tool. After screwing the weight all the way into the boring head, the turns column of the lookup is used to determine how many rotations of the weight are required to properly position the weight with respect to the axis of rotation and the center of gravity of the apparatus. After rotating the weight the indicated number of turns, the tool may be operated at high rotational speeds.

Adjusting for another bore range diameter may comprise altering the shaft or in some cases, simply rotating the weight a set number of turns offset from the previous setting. For example, if the bore range was set for 1.250 and the new desired setting is for a bore range of 1.300, then only the balance weight must be rotated on the balance shaft for the difference between the number of turns required for the first setting versus the second setting. Note that each boring bar configuration has its own unique lookup table.

The cutting portion of the boring bar may make use of any known technology such as but not limited to carbide, diamond infused metals, or any other cutting component. One or more embodiments of the bar holder may allow for horizontal and vertical mounting of boring bars and in either configuration any known tool capable of rotational operation may be coupled with the bar holder. The balance system is designed to work with boring bars in the vertical orientation. The larger diameter of the horizontal configurations typically does not utilize high rotational speed to achieve high cutting surface speeds.

By utilizing one or more embodiments of the invention at high rotational speeds, faster turnaround at a given machine is possible since the rate at which a part may be machined may be drastically shortened. This allows for lower overall costs and higher profits for a shop utilizing an embodiment of the invention.

BRIEF DESCRIPTION OF THE DRAWINGS

FIG. 2A illustrates a perspective view of one embodiment of the variable radius balanced boring head.

FIG. 2B illustrates a side view of one embodiment of the variable radius balanced boring head.

FIG. 2C illustrates another perspective view of one embodiment of the variable radius balanced boring head.

FIG. 2D illustrates a bottom view of one embodiment of the variable radius balanced boring head.

FIG. 4 provides the names of the various elements shown in FIG. 3.

FIG. 6 shows the lookup for the 0.250 diameter boring bar configuration.

FIG. 7 shows the lookup for the 0.312 diameter boring bar configuration.

FIG. 8 shows the lookup for the 0.375 diameter boring bar configuration.

FIG. 9 shows the lookup for the 0.437 diameter boring bar configuration.

FIG. 10 shows the lookup for the 0.500 diameter boring bar configuration.

DETAILED DESCRIPTION OF THE INVENTION

A variable radius balanced boring head enabling high speed operation will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
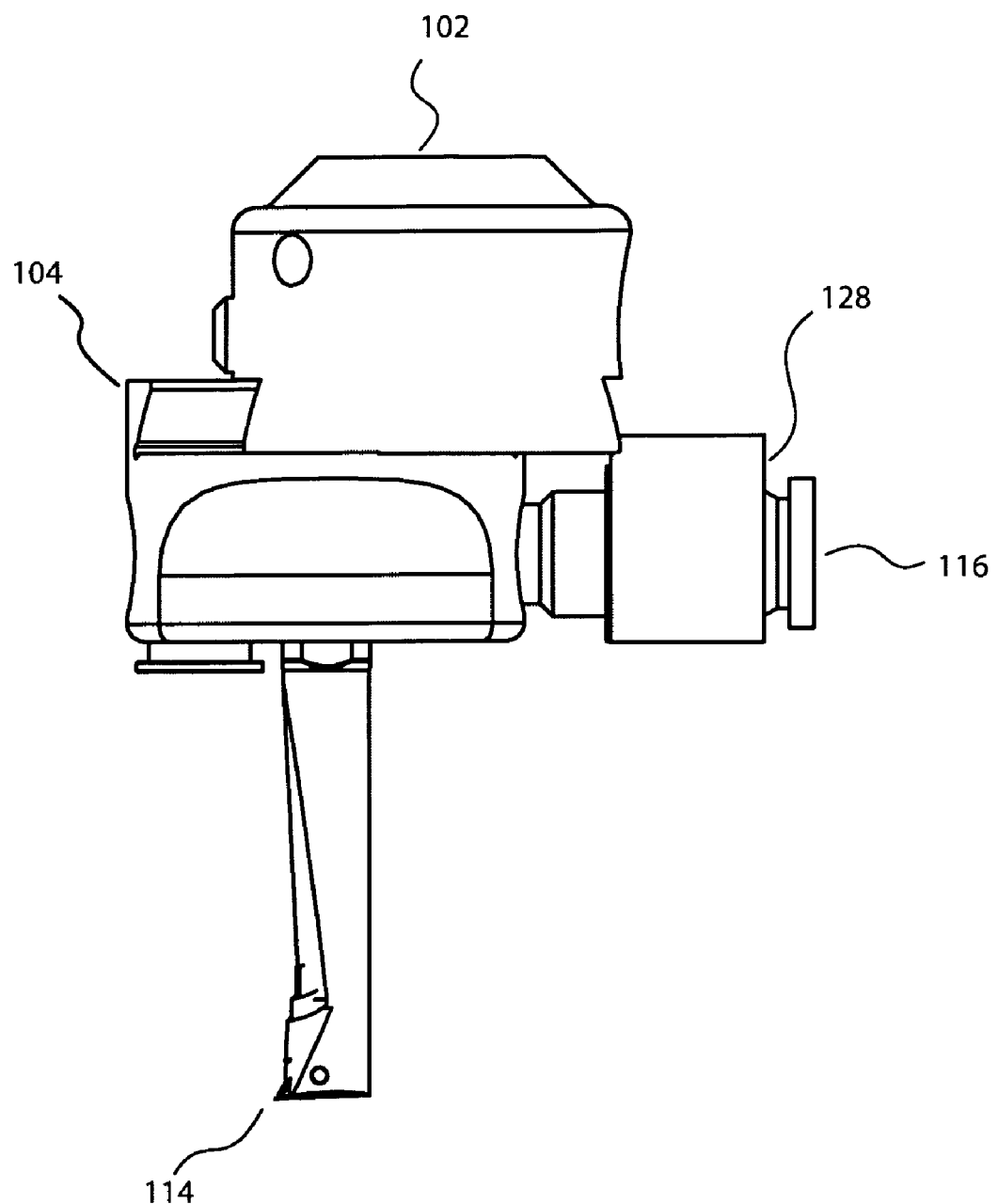
FIG. 1 illustrates an embodiment of the variable radius balanced boring head.

One or more embodiments of the invention enable a boring head to hold a boring tool at an adjustable offset from the axis of rotation in a balanced configuration while maintaining stability when rotating at high speed. FIG. 1 illustrates an embodiment of the variable radius balanced boring head. One or more embodiments of the invention enable boring head body 102 to hold boring bar 114 at an adjustable offset from the axis of rotation. The adjustable offset is performed by displacing bar holder 104 which may comprise a dial screw or any other means for displacing bar holder 104 with respect to the axis of rotation. The apparatus in a balanced configuration while maintaining stability when rotating at high speed by displacing balance weight 128 along the axis formed by balance shaft 116. The apparatus may be configured for a given diameter of operation through use of alternate size components and offsetting a balance weight to account for the components in use. FIG. 2 illustrates perspective views a side view and a bottom view of the variable radius balanced boring head shown in FIG. 1.

Figure 3:
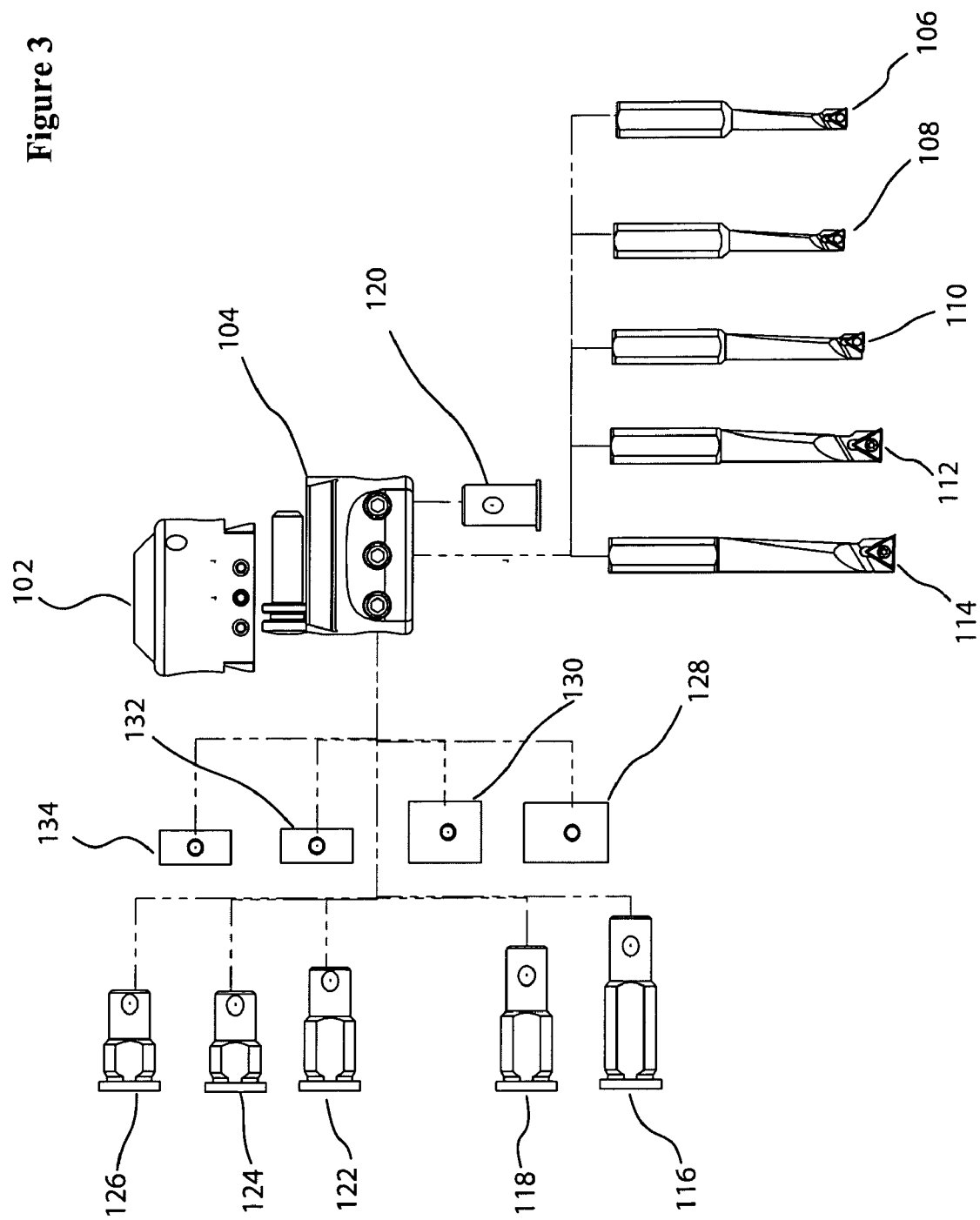
FIG. 3 illustrates a family view showing the possible configurations that may created given a range of balance shafts, balance weights and boring bars.
Figure 5:
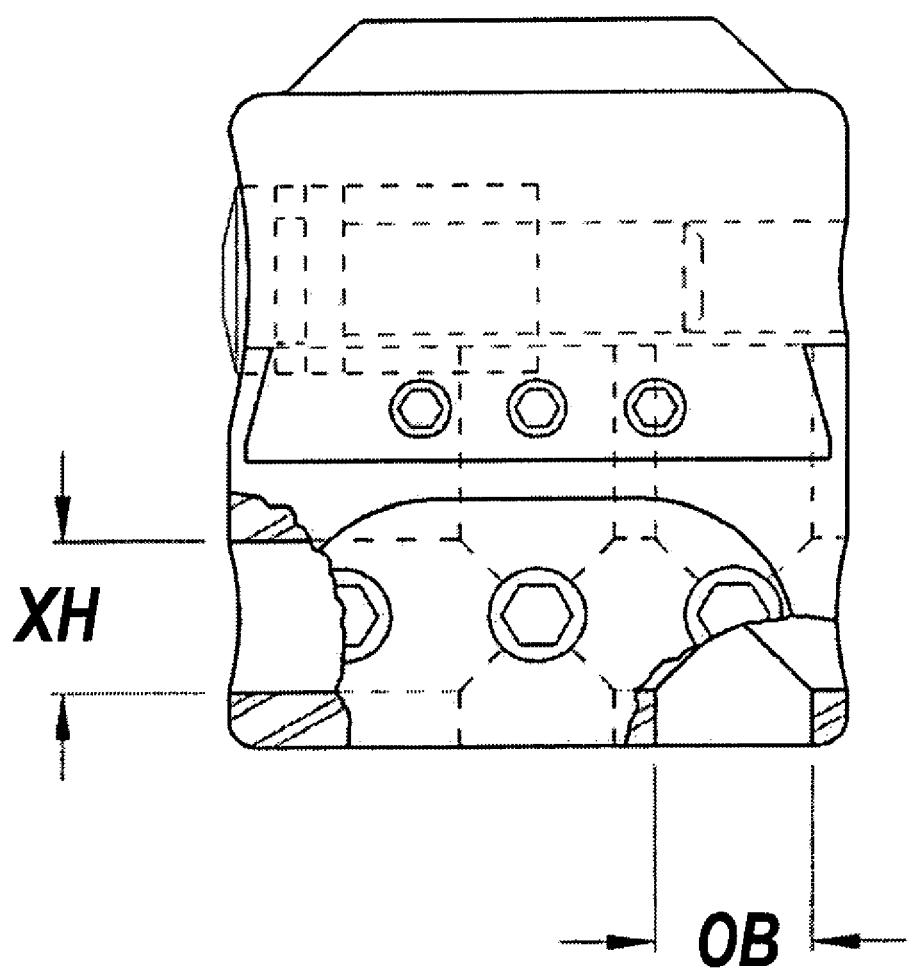
FIG. 5 shows the boring head and bar holder with designations for the horizontal and vertical tool holes.

FIG. 3 illustrates a family view showing the possible configurations that may created given a range of balance shafts, balance weights and boring bars. FIG. 4 provides the names of the various elements shown in FIG. 3. For example, boring head body 102 is shown separated from bar holder 104 wherein the cylindrical component shown between boring head body 102 and bar holder 104 comprises a dial screw for displacing said bar holder orthogonal to the axis of rotation of boring head body 102. Any other method of displacing bar holder orthogonal to the axis of rotation of boring head body 102 is in keeping with the spirit of the invention. Various boring bars 106, 108, 110, 112 and 114 are shown and may be inserted into bar holder 104 vertically. The apparatus is designed to work with boring bars in the vertical orientation. The larger diameter of the horizontal configurations typically may or may not utilize high rotational speeds. When boring bars 106, 108, 110, 112 and 114 are utilized in the vertical configuration, balance shafts 116, 118, 120, 122, 124 and 126 are utilized in the horizontal configuration as shown and coupled with bar holder 104. Balance weights 128, 130, 132 and 134 can then be coupled with the particular chosen balance shaft and the balance weight or weights chosen are displaced along the horizontal axis parallel to the balance shaft. One method of displacing the balance weights is to rotate the balance weight along a threaded embodiment of a balance shaft. Any other method of displacing the balance weights is in keeping with the spirit of the invention. Balance shaft 120 is shown in a vertical position and is also used to balance a boring bar that is held in the vertical position with minimal displacement. In one embodiment, balance shaft 120 is not limited to use in as a balance weight for horizontal tool positions, but is shown in this configuration in this figure to demonstrate a vertical balance shaft arrangement. In another embodiment, balance shaft 120 cannot utilize any of balance weights 128, 130, 132 or 134 and balance shaft 120 is not limited to use in the OB hole. There are configurations that use balance shaft 120 in the XH, but it is shown in the OB hole because this is a valid configuration and the balance shaft 120 is the only shaft that can be positioned in the OB hole. FIG. 5 shows the boring head body and bar holder with designations for the horizontal and vertical tool holes. The XH designation is for use with balance shafts in the horizontal axis. The OB designation is for use with a balance shaft in the vertical axis parallel to the axis of rotation of the boring head. (XH signifies Cross Hole, this is the horizontal hole. OB signifies Outboard Hole.)

Figure 11:
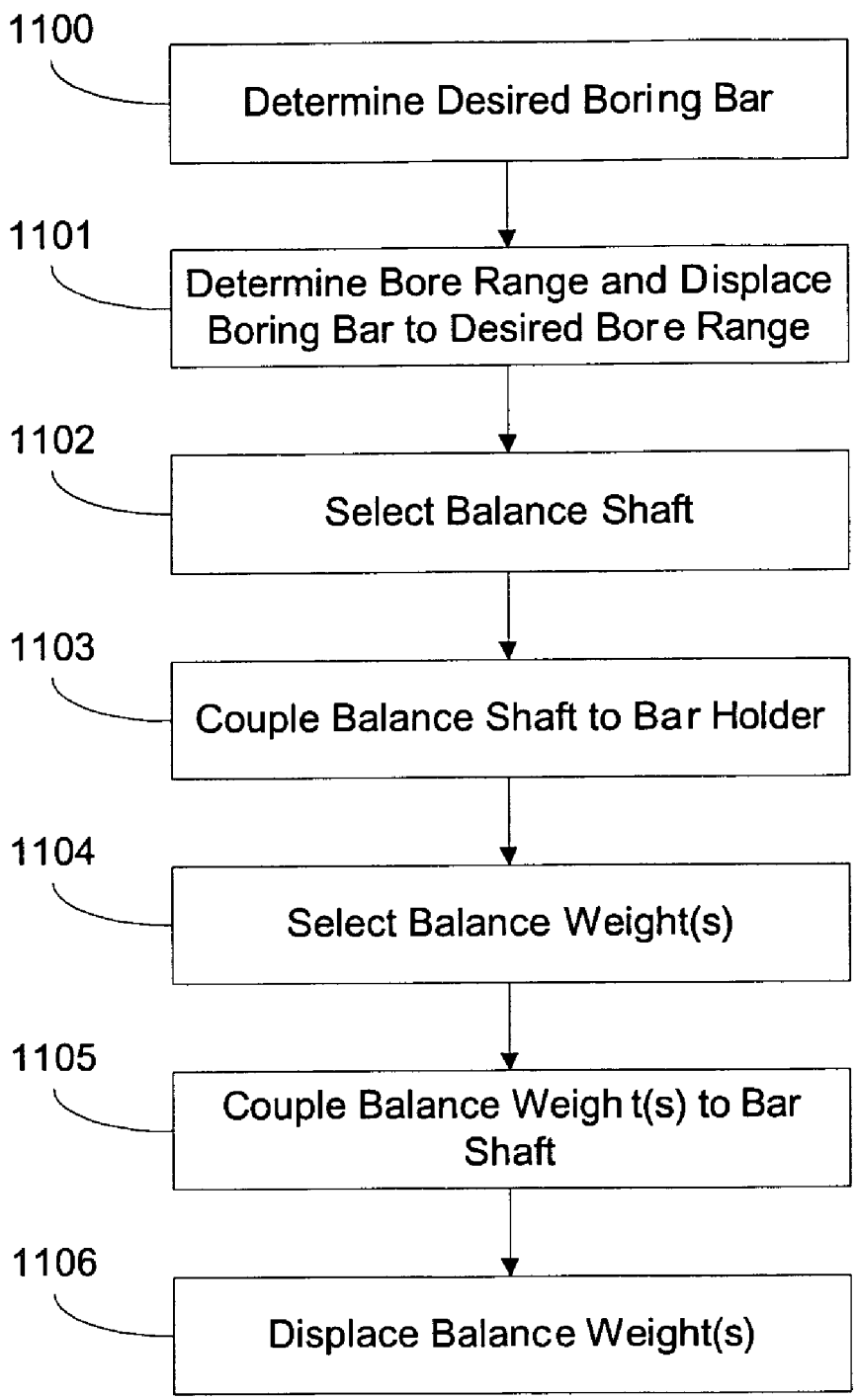
FIG. 11 details an embodiment of the method for utilizing an embodiment of the invention.

One method of determining the various components to use for a given bore range comprises weighing the various components and/or calculating their mass and center of gravity offsets from the axis of rotation to enable a machinist to change the bore range on a machine while keeping an embodiment of the present apparatus in balance for high speed use. A quicker method of operation allows for pre-calculation of the various settings required and storing the settings in a way that allows a machinist to quickly adjust the apparatus without undue calculations. When the various component settings for a desired bore range have been pre-calculated, they may be stored and used from a lookup table. FIGS. 6-10 show lookups for 0.250, 0.312, 0.375, 0.437 and 0.500 minimum diameter boring bar configurations respectively. FIG. 11 details an embodiment of the method for utilizing an embodiment of the invention. For example, for a desired bore, a desired boring bar is determined at 1100. Given that boring bar 106 is to be used and referring to FIG. 6 that corresponds to this boring bar, a bore range is determined at 1101. Then after a desired bore range is found in the lookup table such as 1.250, the correct balance shaft for that bore range is selected at 1102 by reading to the right in the lookup in the shaft column, in this case S-1, (balance shaft 116 as per FIG. 4). At this point, the balance shaft is coupled to the bar holder at 1103. The lookup also shows the correct tool hole in which to place the tool, i.e., XH or OB as per FIG. 5. The weight column is the used to obtain the proper balance weight to use at 1104 in balancing the apparatus, in this case W-2 (balance weight 130 as per FIG. 4). If more than one weight appears in the weight column then both weights are used in the order notated in the weight column. Balance weight 130 is then installed onto the balance shaft at 1105. Balance shaft 116 is then inserted into the XH (cross hole as per FIG. 5) and the set screw is rotated in order to engage the dimple on the shaft of the tool. Any other method of securing balance shaft 116 is in keeping with the spirit of the invention. After screwing the weight all the way into the boring head body, the turns column of the lookup is used to determine how many rotations of the weight are required to turn the weight, which displaces the balance weight at 1106 with respect to the axis of rotation and the center of gravity of the apparatus, in this case 5 turns are required. After rotating the weight the indicated number of turns, the tool may be operated at high rotational speeds.

Adjusting for another bore range diameter may comprise altering the shaft or in some cases, simply rotating the weight a set number of turns offset from the previous setting. For example, if the bore range was set for 1.250 and the new desired setting is for a bore range of 1.300, as per the example in the previous paragraph then only the balance weight must be rotated on the balance shaft for the difference between the number of turns required for the first setting versus the second setting, in this case 8 minus 5 or 3 turns. If there are two weights listed in the table for a given cell, they are listed in the order they need to be placed on the shaft. (ie. W-3/W-4, the W-3 is threaded on the shaft before the W-4 weight). The first weight should be completely set before the second weight is installed. In order to reposition the weight, the set screw must be loosened, the weight adjusted the desired number of turns and the set screw must be retightened.

While the invention herein disclosed has been described by means of specific embodiments and applications thereof, numerous modifications and variations could be made thereto by those skilled in the art without departing from the scope of the invention set forth in the claims.

What is claimed is:

1. A balancing system for a variable radius boring head comprising:
    a variable radius boring head configured to couple with a machine capable of rotating said boring head, said boring head comprising:
        a boring head body coupled to a displacing boring head bar holder, said displacing boring head bar holder displaced from an axis of rotation of said boring head body, and said displacing boring head bar holder comprising:
            an integrated plurality of means for engaging a balance shaft comprising at least:
                a plurality of means for vertically engaging said balance shaft; and
                a means for horizontally engaging said balance shaft;
    a boring bar coupled to said displacing boring head bar holder;
    a means for balancing said boring head, comprising:
        said balance shaft;
        a first set screw for coupling said balance shaft to said displacing boring head bar holder;
        a lookup table specifying selection of said balance shaft and said balance shaft engagement orientation.

2. The balancing system of claim 1 further comprising at least one balance weight thread coupled to said balance shaft.

3. The balancing means of the system of claim 2 further configured where said at least one balance weight is selected and adjusted as specified in said lookup table.

4. The balancing means of the system of claim 3 wherein said at least one weight is adjusted by affixing a second set screw to said balance weight to hold said balance weight against said balance shaft.

5. The balancing means of the system of claim 4 wherein said at least one balance weight is adjusted as specified in said lookup table by rotating said second set screw a specified number of turns.

6. The balancing system of claim 1 wherein said lookup table specifies balancing criteria based on bore range.

7. The balancing system of claim 1 wherein said balance shaft is coupled to said displacing boring head bar holder by engaging said first set screw into a dimple on said balance shaft.

8. A method of balancing a variable radius boring head comprising:
    displacing a boring bar holder of a boring head orthogonally with respect to an axis of rotation of said boring head;
    selecting a desired bore range for a boring operation;
    coupling a boring bar of said desired bore range to said boring bar holder;
    selecting a balance shaft as specified by a lookup table;
    selecting a balance shaft orientation as specified by said lookup table;
    coupling said balance shaft to said boring bar holder in said selected balance shaft
        orientation by adjusting a first set screw to engage a dimple on said balance shaft;
    wherein said selection of said balance shaft and said balance shaft orientation are chosen from said lookup table based on said desired bore range.

9. The method of claim 8 further comprising:
    selecting at least one balance weight as specified by said lookup table based on said desired bore range;
    coupling said at least one selected balance weight to said selected balance shaft.

10. The method of claim 8 further comprising: thread coupling said at least one selected balance weight to said selected balance shaft.

11. The method of claim 8 further comprising:
    thread coupling said at least one selected balance weight to said selected balance shaft, and further holding said selected balance weight in place against said balance shaft by means of a second set screw.

12. The method of claim 11 further comprising:
    adjusting said at least one selected balance weight in place against said balance shaft by turning said second set screw a number of rotations specified in said lookup table.

13. An improved apparatus for balancing a variable radius boring head, said boring head configured with at least two vertical tool holes and at least one horizontal tool hole, wherein a boring head bar holder of said boring head is displaced from an axis of rotation of a boring head body of said boring head, said improved apparatus comprising:
    a balance shaft coupled to a displacing bar holder in one of said tool holes by engaging a first set screw into a dimple on said balance shaft;
    at least one weight thread coupled to said balance shaft, said weight and held in place on said balance shaft by a second set screw;
    wherein said balancing is performed by selecting said balance shaft and said at least one weight according to a lookup table.

14. The improved apparatus of claim 13 wherein said at least one weight is specifically located on said balance shaft by rotating said second set screw a number of turns proscribed by said lookup table to precisely balance said variable radius boring head.

15. The improved apparatus of claim 13 wherein said balance shaft and said at least one weight are selected according to said lookup table based on a desired bore range.

16. The improved apparatus of claim 15 wherein said desired bore range comprises a boring bar size ranging from at least a one quarter inch to at least three inches.

* * * * *